United States Patent
Woody (10) Patent No.: US 8,881,680 B1
(45) Date of Patent: Nov. 11, 2014

(54) OUTDOOR LITTER BOX SIFTING SYSTEM

(76) Inventor: David Woody, Stillwater, MN (US)

(*) Notice: Subject to any disclaimer, the term of this patent is extended or adjusted under 35 U.S.C. 154(b) by 73 days.

(21) Appl. No.: 13/443,318

(22) Filed: Apr. 10, 2012

(51) Int. Cl.
*A01K 1/035* (2006.01)

(52) U.S. Cl.
USPC .......................... 119/165; 119/166

(58) Field of Classification Search
CPC .................................. A01K 1/0107
USPC .................. 119/161, 163, 165, 484
See application file for complete search history.

(56) References Cited

U.S. PATENT DOCUMENTS

| | | | |
|---|---|---|---|
| 4,021,975 A | 5/1977 | Calkins | |
| 4,022,263 A * | 5/1977 | Beckett et al. | 160/92 |
| 5,165,366 A | 11/1992 | Harvey | |
| 5,394,835 A | 3/1995 | Gatta | |
| 5,564,364 A * | 10/1996 | Kovacs et al. | 119/163 |
| 5,623,892 A * | 4/1997 | O'Rourke et al. | 119/165 |
| 5,738,040 A * | 4/1998 | Simmons | 119/165 |
| 5,749,317 A * | 5/1998 | Richey et al. | 119/166 |
| 5,975,017 A | 11/1999 | Cameron | |
| 5,983,831 A * | 11/1999 | Thompson | 119/165 |
| 6,237,534 B1 * | 5/2001 | Schwartz | 119/165 |
| 6,439,161 B1 | 8/2002 | Clemmons | |
| 7,530,331 B1 | 5/2009 | Malachowski | |
| 2006/0054102 A1 * | 3/2006 | Hailey | 119/482 |
| 2007/0039555 A1 * | 2/2007 | Tycer | 119/165 |
| 2010/0175631 A1 * | 7/2010 | Bennatt | 119/472 |
| 2011/0297096 A1 * | 12/2011 | Northrop et al. | 119/165 |

OTHER PUBLICATIONS http://www.thefreedictionary.com/mount.*

* cited by examiner

*Primary Examiner* — Rob Swiatek
*Assistant Examiner* — Danielle Clerkley
(74) *Attorney, Agent, or Firm* — Montgomery Patent & Design; Robert C. Montgomery (57) ABSTRACT

A litter box and sifting system having a cat door that is installed on the interior wall of a building and a litter box assembly located on the exterior side of the building. The litter box is accessed through a cat door and an adjustable tunnel. At the bottom of the litter box are interchangeable tray assemblies containing litter. The litter can be selectively sifting through fixed screens and removable sliding panels. The litter box enclosure includes a fan to assist ventilation through louvers, an interior light, a rechargeable battery for powering the fan and light, and a solar cell to recharge the battery.

18 Claims, 8 Drawing Sheets

OUTDOOR LITTER BOX SIFTING SYSTEM

RELATED APPLICATIONS

Not Applicable.

FIELD OF THE INVENTION

The presently disclosed subject matter is directed towards litter boxes. More particularly the present invention relates to outdoor litter boxes.

BACKGROUND OF THE INVENTION

Keeping pets can be a rewarding activity. However, it can also be very time consuming, requiring one to seemingly constantly feed, groom, and clean-up after their pets. For those that raise, breed, or board cats, their responsibilities also include the less-than-fun task of maintaining litter boxes. As may be appreciated, even the best kept and best maintained litter box will often result in odors inside of a home. Such odors can spread even to other rooms even if doors are closed. This is especially true when the litter box is being cleaned or otherwise serviced.

Additionally, closing a door to keep odors at bay means that someone will have to open the door at necessary times throughout the day to allow the cat, or cats, access to the litter box. This requires rather constant vigilance. Accordingly, there exists a need for cat litter boxes that can be readily accessible to pets without odors. Beneficially, such cat boxes would have features that make maintaining cat litter fast and easy.

SUMMARY OF THE INVENTION

The principles of the present invention provide for cat litter boxes that are readily accessible to pets, that reduce or eliminate odors, and that include features that make maintaining litter boxes fast and easy.

A litter box and sifting system that is in accord with the principles of the present invention includes a litter box enclosure with a front wall having an opening, a back wall, and a tray support. A mounting system mounts the litter box enclosure onto the exterior of a building. The litter box and sifting system further includes cat door assembly having a door over an entrance, a stationary tunnel section that extends from the door, and an adjustable tunnel section that connects the stationary tunnel section to the opening of the litter box enclosure. The cat door assembly enables a pet to pass from the interior of a building into the litter box enclosure. A first tray assembly holding cat litter is mounted on the tray support. A fan attached to the litter box enclosure evacuates odors.

An interior mounting frame attaches the door over the entrance and to the interior of a building. Beneficially, the door is a flap-type door. Additionally, an exterior mounting frame also attaches the cat door assembly to the exterior of the building. Preferably, the tunnel sections include sealing features for weatherproofing the litter box and sifting system. In practice a switch attached to the interior mounting frame turns on the fan when a pet passes through the door. That switch can also activate a light.

The litter box enclosure may have a removable lid, while the tray support can include a bottom skirt having sides that form "U"-shaped channels to support the first tray assembly. In that case, the first tray assembly can have inverted first "U"-shaped tray lips that mate with the first "U"-shaped channels. The back wall can include a stop feature for limiting the travel of the first tray assembly. The first tray assembly has a first tray screen for sifting litter, a first tray slide plate for selectively covering the first tray screen, and a first tray slide plate aperture for enabling separating the first tray slide plate from the first tray slide plate.

The litter box and sifting system may also include a second tray assembly that is beneficially interchangeable with the first tray assembly. The skirt is then configured to arrange the first tray assembly and the second tray assembly in an over-under configuration. The litter box enclosure can then have an internal tapering curb feature that funnels pet feces toward the first tray assembly.

The removable lid preferably includes a plurality of louvers for ventilating the litter box enclosure. A bracket assembly mounts the litter box enclosure to the exterior of a building. Power for the fan is provided by a rechargeable battery that is recharged by a solar cell.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 2b is an exploded view of a cat door assembly 20 of the litter box and sifting system 10 shown in FIG. 1 and FIG. 2a;

FIG. 3a is a top view of a tray assembly 90a, 90b of the litter box and sifting system 10 shown in FIGS. 1 and 2a;

FIG. 3b is a bottom view of a tray assembly 90a, 90b shown in FIG. 3a;

FIG. 4 is a perspective view of a mounting bracket assembly 110 of the litter box and sifting system 10 shown in FIGS. 1 and 2a;

DESCRIPTIVE KEY 10 litter box and sifting system
20 cat door assembly
22 door
24 stationary tunnel section
25 exterior mounting frame
26 interior mounting frame
28 adjustable tunnel section
30 tunnel connector section
32 female sealing feature
34 male sealing feature
60 enclosure
62 front wall
63 first side wall
64 rear wall
65 second side wall
68 curb feature
76 mounting channel
78 skirt
80 first channel
82 second channel 84 stop feature
90a first tray assembly
90b second tray assembly
92 tray screen
94 tray slide plate
95 tray slide plate aperture
96 slide plate channel
98 tray lip
100 pull tab
102 tray side wall
103a tray rear wall
103b tray front wall
108 fastener
110 mounting bracket assembly
112 bracket appendage
114 bracket anchoring member
116 anchor bolt
130 lid
132 first louver
150 light/fan unit
152 switch
153 housing
154 exterior cover
155 battery access door
156 second louver
157 fan
158 solar cell
160 battery
161 lamp
162 controller
164 wiring
166 connector
200 structural wall
202 floor
210 litter

DETAILED DESCRIPTION OF THE PREFERRED EMBODIMENT

In accordance with the invention, the best mode is presented in terms of a preferred embodiment, herein depicted within FIGS. 1 through 6. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Figure 1:
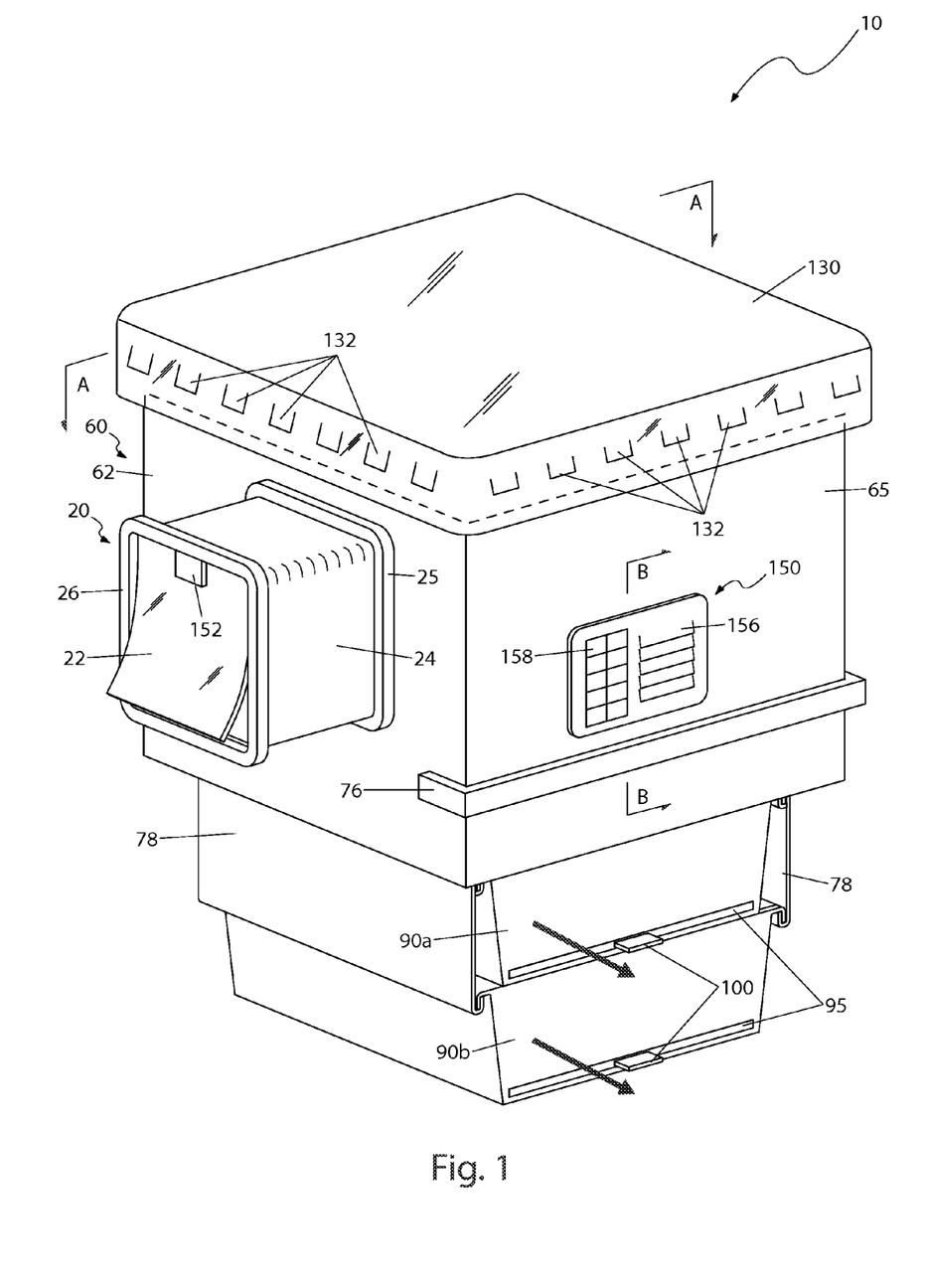
FIG. 1 is a front perspective view of a litter box and sifting system 10 that is in accord with the principles of the present invention.
Figure 2A:
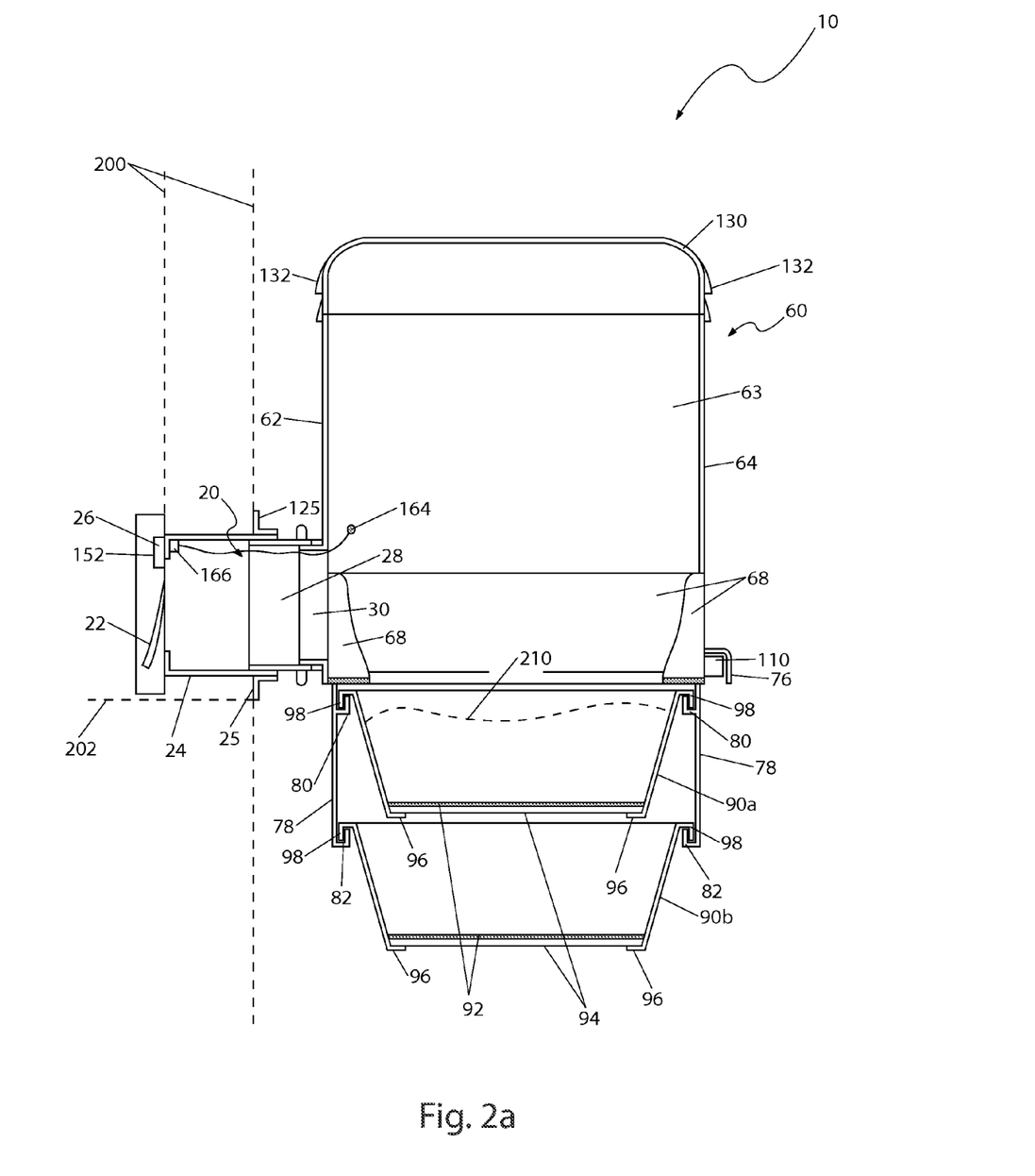
FIG. 2a is a section view of the litter box and sifting system 10 taken along section line A-A of FIG. 1.
Figure 2B:
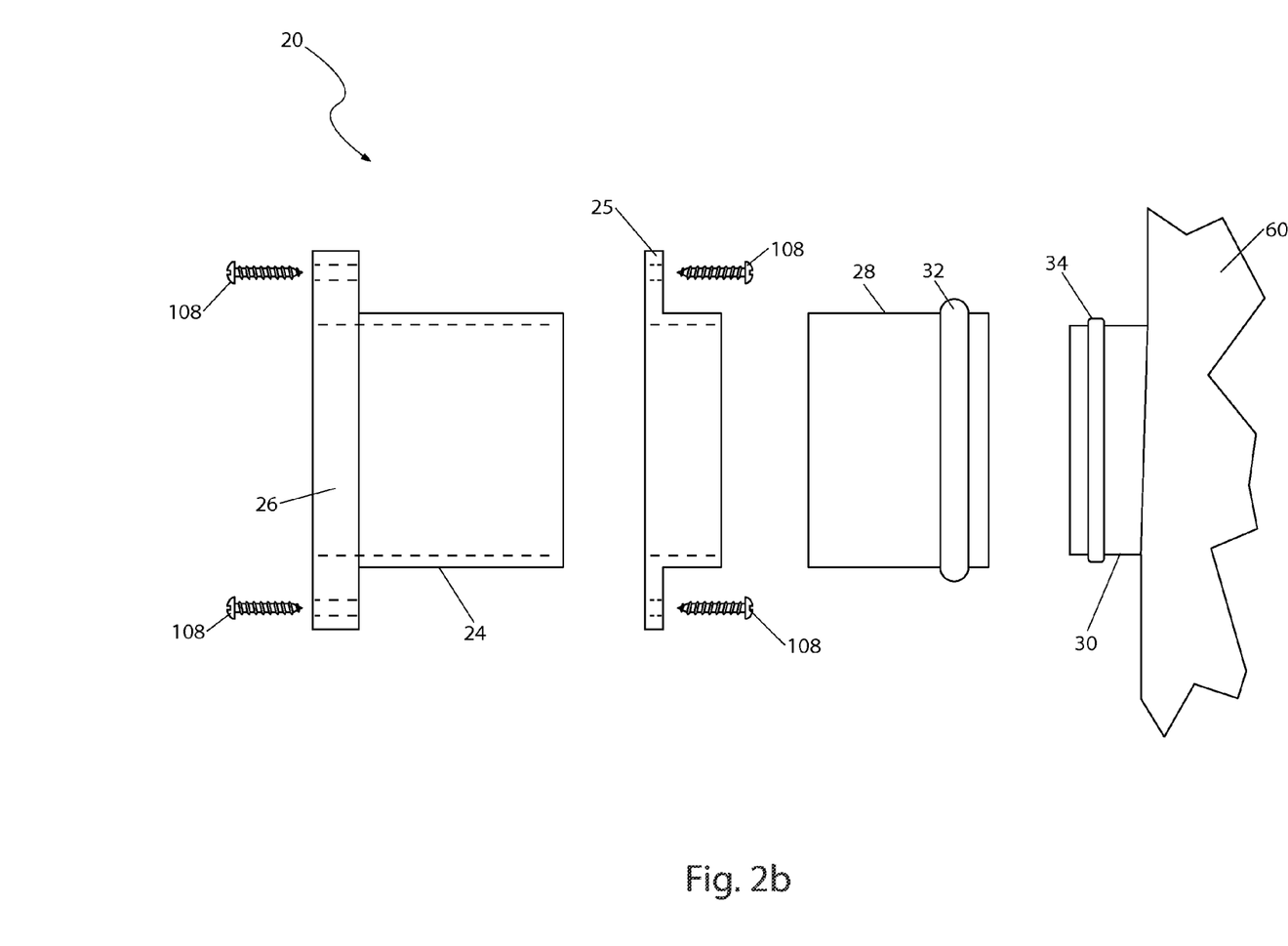

Referring now to FIGS. 1, 2a, and 2b, respectively perspective, section, and exploded views of a litter box and sifting system 10 that is in accord with the present invention. The litter box and sifting system 10 includes a weatherproof cat door assembly 20, beneficially comprised of stainless steel or plastic, which is attached to a structural wall 200 of a building. When so mounted, the cat door assembly 20 enables a pet to pass from the interior of the building into a large cat litter box enclosure 60 which is mounted on the exterior of the structural wall 200.

The enclosure 60 has a front wall 62 that retains the cat door assembly 20, a first side wall 63, a rear wall 64, a second side wall 65 with a mounted solar-powered light/fan unit 150, and a tunnel connector section 30. Towards the bottom of the enclosure 60 is a first channel 80 and a second channel 82 that are arranged in an over-under configuration so as to provide sliding support for a first tray assembly 90a and a second tray assembly 90b (see FIGS. 3a and 3b). The first and second tray assemblies 90a, 90b enable sifting and reuse of litter 210 (see FIG. 2a) in a manner that is described in more detail subsequently.

Still referring to FIGS. 1, 2a, and 2b, the cat door assembly 20 provides easy access for a pet to travel from the interior floor 202 of a building, through an opening in the structural wall 200, and into a tunnel (see below) that leads to the enclosure 60. The cat door assembly 20 has adjustable features which allow installation through structural walls 200 having different thickness and to the enclosure 60 while also providing a weatherproof path for the pet.

The cat door assembly 20 comprises a flap-type door 22, a stationary tunnel section 24 having an integral interior mounting frame 26 that includes an attachment along its upper edge for the door 22, an exterior mounting frame 25 for connecting to the exterior of the structural wall 200, and an adjustable tunnel section 28. The cat door assembly 20 is affixed to the structural wall 200 by preparing the structural wall 200 with a rectangular opening dimensioned to fit the stationary tunnel section 24. The stationary tunnel section 24 is inserted through the prepared rectangular opening and is attached by the interior mounting frame 26 to an interior wall using common fasteners 108. The stationary tunnel section 24 is beneficially comprised of a plastic that is capable of being trimmed to length by a user. After the stationary tunnel section 24 is mounted the exterior mounting frame 25 is fit over the stationary tunnel section 24 and attached to the exterior of the structural wall 200 using fasteners 108.

The exterior mounting frame 25 comprises a rectangular frame-like structure having a central opening sized to closely slip over the stationary tunnel section 24. The exterior mounting frame 25 is configured to provide a weatherproof attachment against the exterior of the structural wall 200. The proximal end of the adjustable tunnel section 28 fits through the exterior mounting frame 25 and into the stationary tunnel section 24. The adjustable tunnel section 28 further includes a female sealing feature 32 (such as an expanded hollow ring) at its distal end which forms a snapping mechanical connection with a mating male sealing feature 34 (such as a ring that fits into the expanded female sealing feature 32) of the tunnel connector section 30 of the enclosure 60. As shown, the tunnel connector section 30 extends from the front wall 62.

Figure 6:
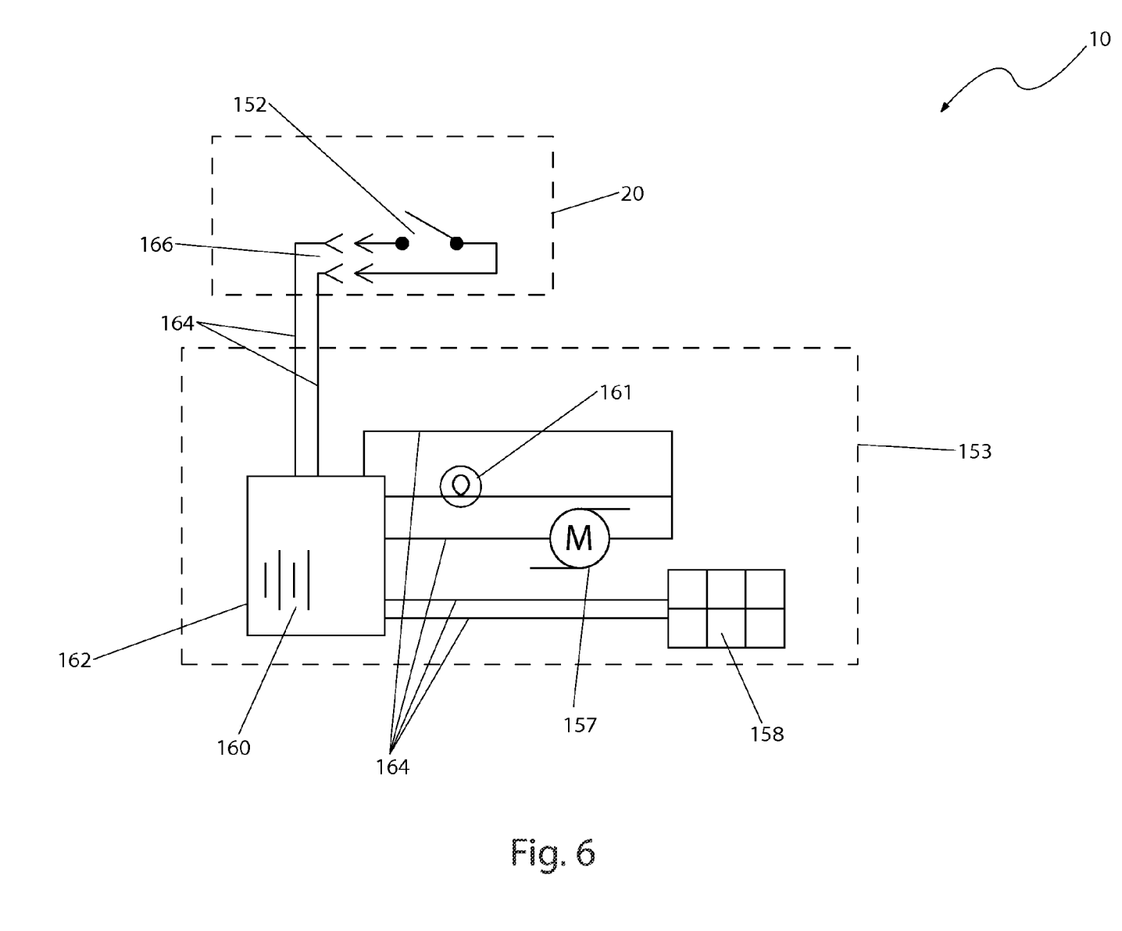

Referring now to FIGS. 1, 2a, and 6, attached to the top of the interior mounting frame 26 is a switch 152 in series with a connector 166 that interconnects wiring 164. As explained in more detail subsequently the switch 152 initiates the light/fan unit 150 in the enclosure 60 to light the enclosure 60 and to evacuate odors.

Referring now primarily to FIG. 1 and FIG. 2, the enclosure 60 is a large rectangular structural having sufficient internal space to comfortably contain a large cat. The enclosure 60 includes both a transparent lid 130 that is removably attached to a top opening and an integral bottom skirt 78 that extends downward from three (3) perimeter side edges. The front and rear sides of the skirt 78 form the first channel 80 and the subjacent second channel 82. The channels 80, 82 are "U"-shaped appendages that provide edge support for both a first tray assembly 90a and a second tray assembly 90b.

The tray assemblies 90a, 90b include inverted "U"-shaped tray lips 98 that can slide along the first channel 80 and the second channel 82 to enable removal and insertion of the tray assemblies 90a, 90b to and from the skirt 78. The removable tray assemblies 90a, 90b enable sifting and reuse of the litter 210 using tray screens 92 and removable tray slide plates 94 (see FIGS. 3a and 3b and described in more detail subsequently). Referring now to FIG. 4, the first side wall 63 includes an integral downwardly extending stop feature 84 which provides a mechanical limitation to the tray assemblies 90a, 90b upon complete insertion.

Referring back to FIG. 1, the tray slide plates 94 are removed by grasping and pulling pull tabs 100. By pulling the pull tab 100 of the first tray assembly 90a the litter 210 within the first tray assembly 90a can sift through a tray screen 92. The sifted litter 210 falls into the second tray assembly 90b. The positions of the tray assemblies 90a, 90b are then switched to provide sifted litter 210 in the upper position for use by a pet. The original first tray assembly 90a is then emptied of solid waste and installed in the lower position, thus resetting the unit for further use. A quantity of new litter 210 may be added as necessary through the top opening of the enclosure 60 by removing a lid 130.

Continuing to refer to FIG. 1, the lid 130 protects the inner space of the enclosure 60 from weather such as rain, snow, and the like. The lid 130 has a shape that matches the enclosure 60 and includes downwardly extending perimeter edges that are tightly affixed around the top of the enclosure 60 via a friction fit. The lid 130 further includes a plurality of equally-spaced rectangular first louvers 132 that are arranged in a single horizontal row around the vertical sides of the lid 130 to provide ventilation that provides fresh air and that evacuates odors from inside the enclosure 60. The lid 130 is envisioned as being made from a tough, transparent plastic.

The enclosure 60 further includes an internal curb feature 68 and an external mounting channel 76. The curb feature 68 provides an integral triangularly-shaped tapering feature which extends across internal bottoms of each enclosure wall 62, 63, 64, and 65. The curb feature 68 aids in directing the litter 210 and pet feces into the subjacent first tray assembly 90a. The mounting channel 76 has an integrally-molded horizontal appendage shaped as an inverted "U"-shaped that is located along a lower external surface of the first side wall 63, the rear wall 64, and the second side wall 65 of the enclosure 60. The mounting channel 76 has an open bottom that is sized to receive a correspondingly shaped mounting bracket assembly 110 (also see FIG. 4).

Figure 3A:
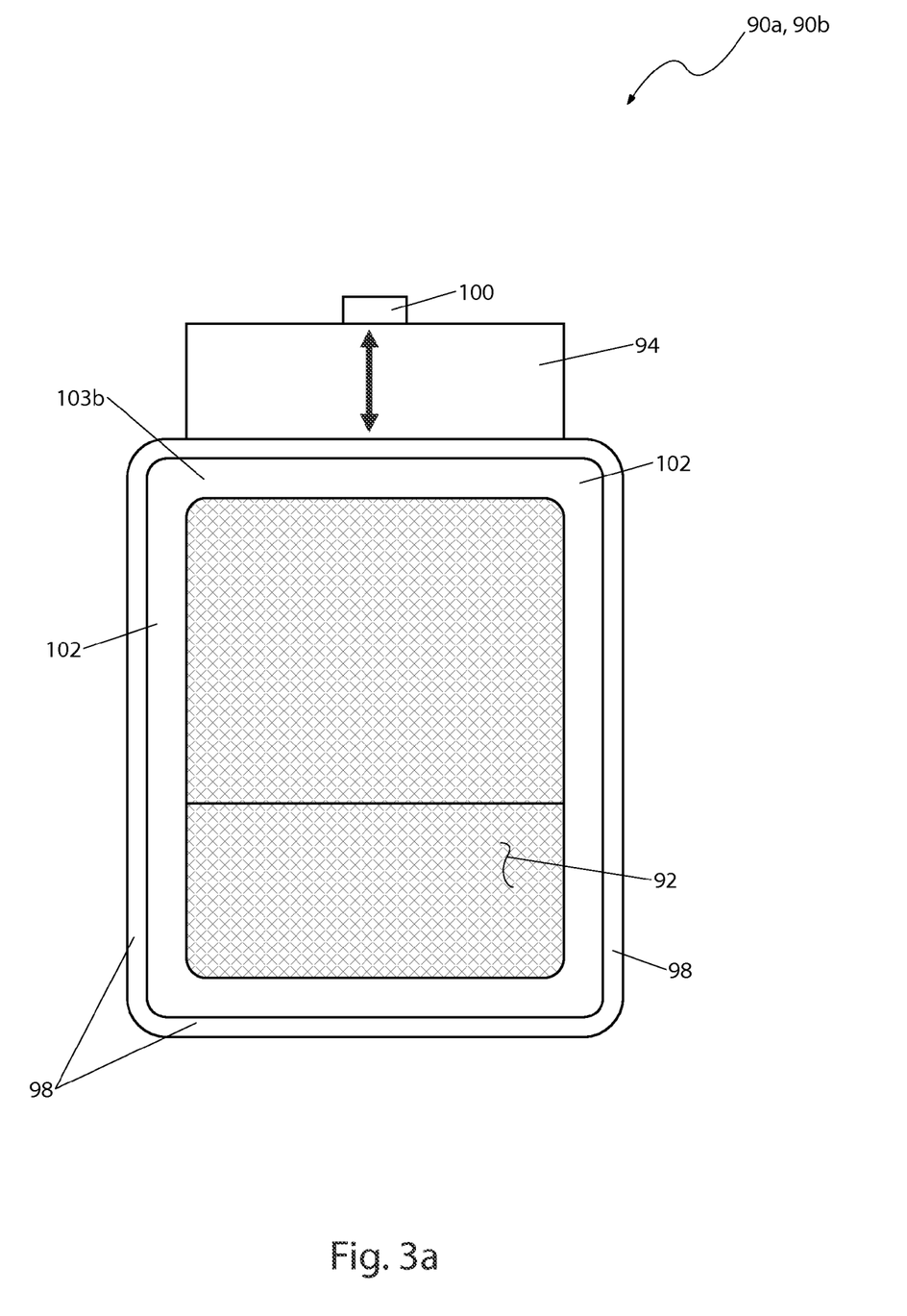
Figure 3B:
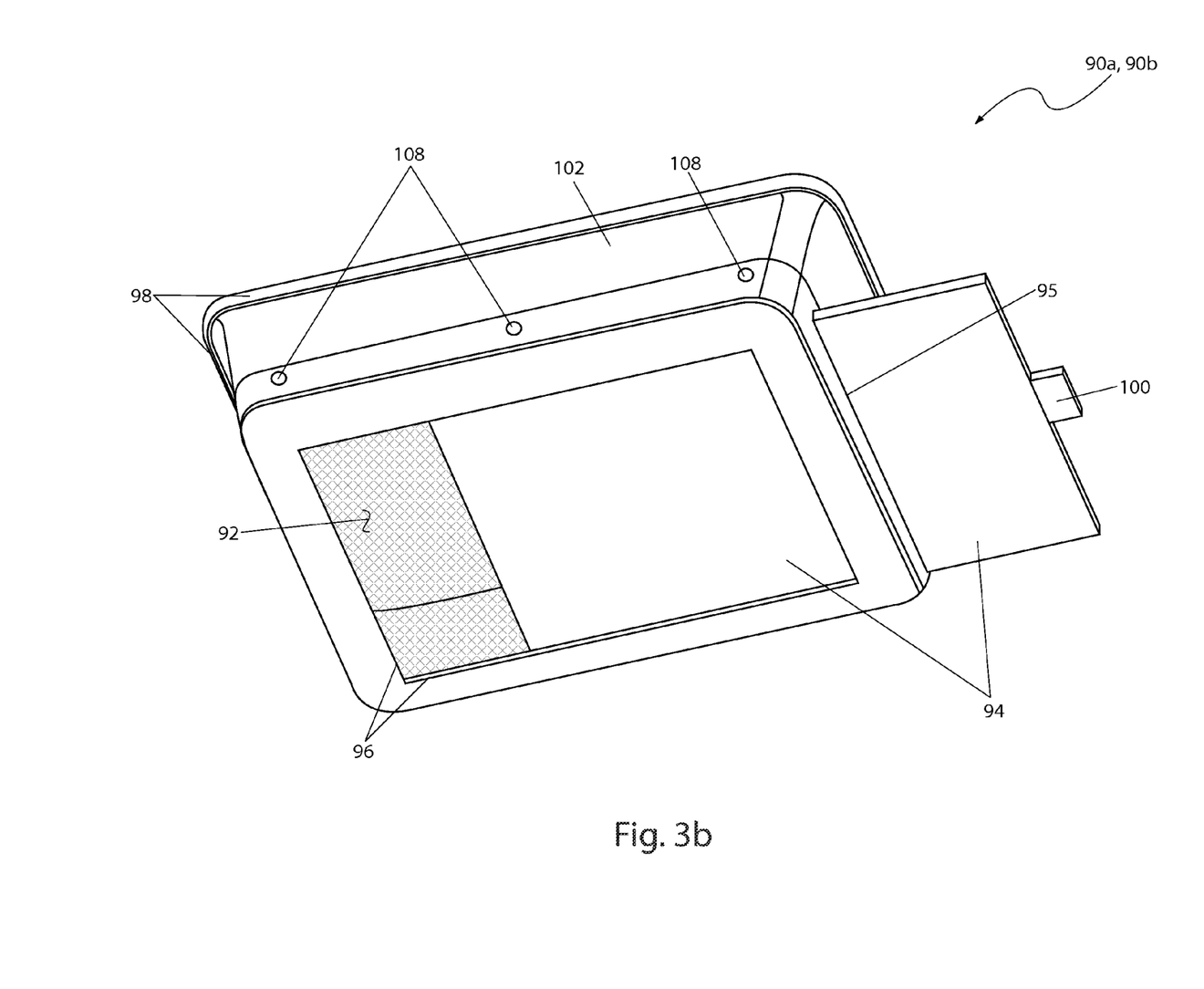
Figure 4:
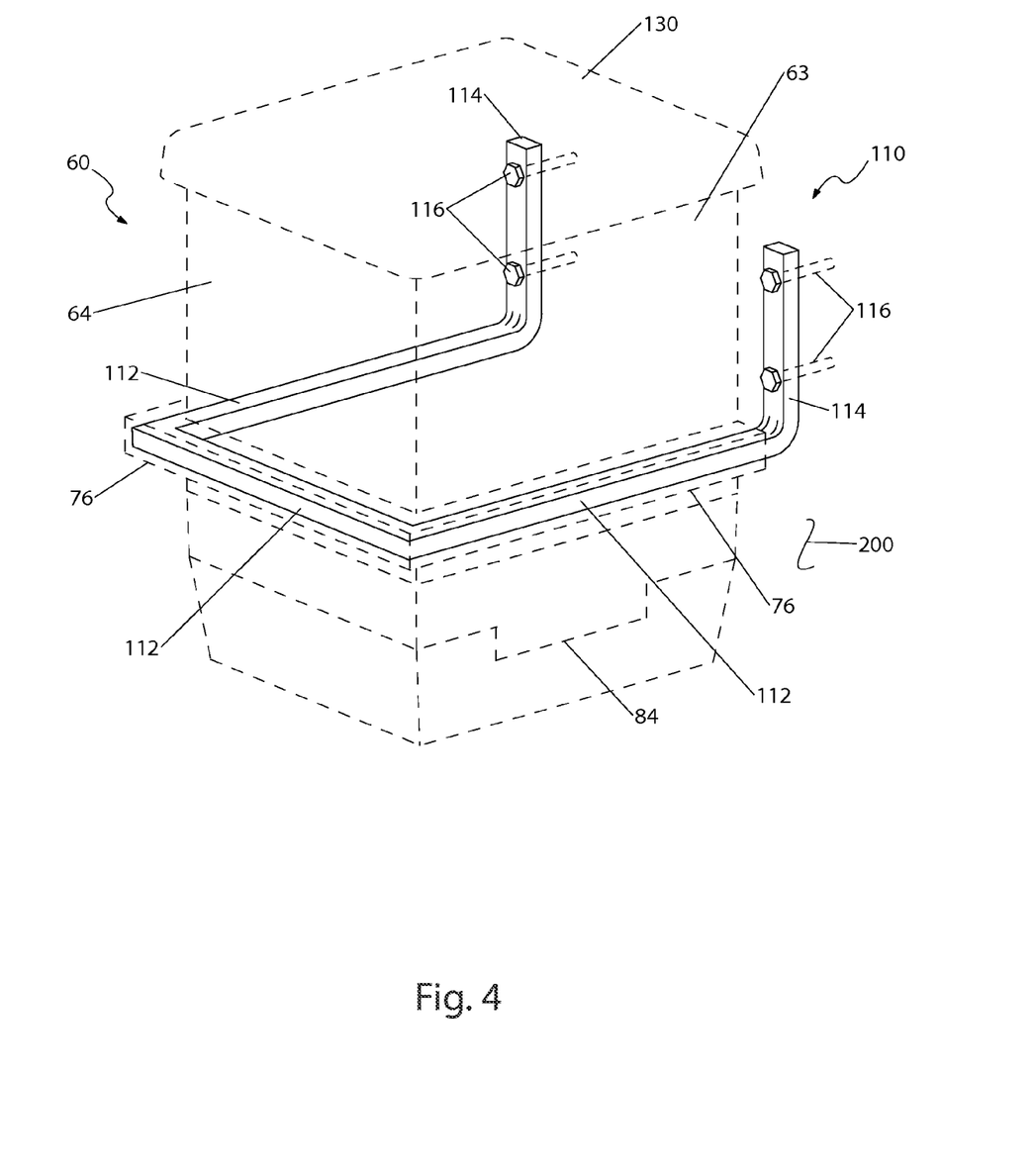

Referring now to FIG. 1 and FIGS. 3a and 3b, the tray assemblies 90a, 90b are identical. This enables them to be selectively situated in either the upper or lower positions and thus to provide gravity-aided sifting of the litter 210. The tray assemblies 90a, 90b are envisioned as being made from corrosion-resistant materials such as plastic, stainless steel, or the like. Each tray assembly 90a, 90b is a generally rectangular shaped, open-topped container having four (4) downwardly tapering walls: two tray side walls 102, a tray rear wall 103a, and a tray front wall 103b. Each tray assembly 90a, 90b also has a tray screen 92, a tray slide plate 94, a tray slide plate aperture 95, a slide plate channel 96 encompassing a rectangular bottom edge, and a tray lip 98 around a rectangular top edge.

The tray screen 92 forms an integral, stationary open-meshed platform that extends along the entire bottom of the tray assembly 90a, 90b which allows litter 210 to flow while sifting out solid waste. The tray slide plate 94 is positioned immediately below and parallel to the tray screen 92. The tray slide plate 94 can be selectively slid across the bottom of the tray screen 92. The tray slide plate 94 is a flat rectangular metal or plastic sheet that includes the integral pull tab 100 along a front edge. The tray slide plate 94 is guided along the side edges by the slide plate channel 96, which is an "L"-shaped cross section member that extends around the entire bottom of the tray assembly 90a, 90b. Each slide plate channel 96 is affixed to the tray walls 103a, and 103b via a plurality of fasteners 108 such as rivets, screws, or the like. The tray slide plate 94 slides outward through a tray slide plate aperture 95 that is formed through the center of the slide tray channel 96 along the tray front wall 103b.

During normal use of the litter box and sifting system 10 the tray slide plates 94 are fully inserted along the slide plate channels 96. This prevents the litter 210 from flowing through the tray screen 92 and retains the litter 210 within the first tray assembly 90a. To sift the litter 210, the tray slide plate 94 is pulled outward using the pull tab 100. This allows the litter 210 to flow downward through the tray screen 92 and subsequently into the subjacent second tray assembly 90b. The tray slide plate 94 is then reinserted; the solid waste is disposed of; and the tray assemblies 90a, 90b are reinserted.

Referring now to FIG. 4, the litter box and sifting system 10 provides a means to mount and support the enclosure 60 and its tray assemblies 90a, 90b on an external surface of a structural wall 200 using a wall-anchored mounting bracket assembly 110. The mounting bracket assembly 110 includes a formed or welded bracket appendage 112 that is beneficially made from square structural tubing. It is preferably made from a strong corrosion-resistant material such as stainless steel, corrosion resistant plated steel, or the like. The bracket appendage 112 forms a horizontally orientated "U"-shaped structural attached to upturned bracket anchoring members 114 that are formed at opposing ends of the bracket appendage 112. The bracket anchoring members 114 enable secure attachment of the mounting bracket assembly 110, and thus the litter box and sifting system 10, to the structural wall 200 using a plurality of common anchor bolts 116 or equivalent fasteners. The mounting bracket assembly 110 is dimensioned such that once it is mounted to a structural wall 200 the three (3) sides of the horizontally orientated "U"-shaped structural enable a snug fit with the open bottom of the mounting channel 76 (see also FIG. 2).

Figure 5:
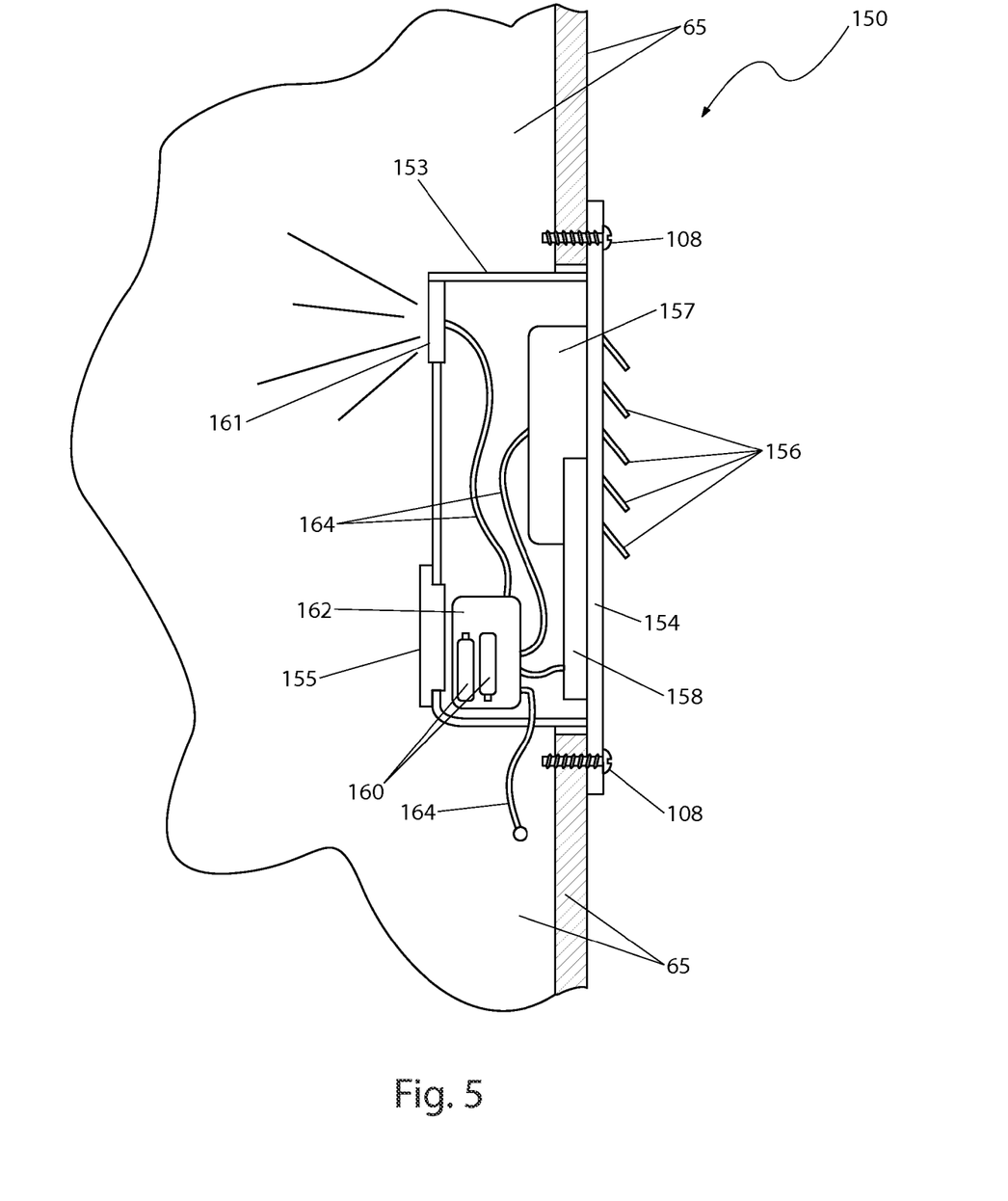
FIG. 5 is a section view of a light/fan unit 150 taken along section line B-B of FIG. 1; and, FIG. 6 is an electrical block diagram of the light/fan unit 150 shown in FIG. 5.

Referring now to FIGS. 5 and 6 the light/fan unit 150 comprises a rectangular plastic housing 153, an exterior cover 154 having a plurality of integrally-molded second louvers 156, a battery access door 155, a fan 157, a solar cell 158, at least one (1) rechargeable battery 160, a lamp 161, a controller 162, and wiring 164. The light/fan unit 150 is shown mounted to the second side wall 65 of the enclosure 60 via an integral exterior cover 154 using a plurality of fasteners 108; however, it is understood that the light/fan unit 150 may be mounted in various positions along an external surface of the enclosure 60 with equal benefit. The light/fan unit 150 provides lighting means and power to evacuate odors from within the enclosure 60.

The light/fan unit 150 is in electrical communication with the switch 152 of the cat door assembly 20 via the wiring 164. The switch 152 is activated by a pet pushing the door 22 of the cat door assembly 20 and closing the switch 152. The switch 152 is a single contact device such as a micro switch. After closure an electrical signal is applied to the controller 162. In turn, the controller 162 energizes a lamp 161 and a fan 157. The lamp 161 is preferably an LED-type lamp while the fan 157 is preferably a small muffin fan or similar such low-noise fan device. The controller 162 includes a self-contained microcontroller and other components necessary to operate the light/fan unit 150. For example, a circuit board, supporting integrated circuits, embedded software, the battery 160, relays, transistors, and the like. Upon receiving the electrical signal from the switch 152, the controller 162 directs power from the battery 160 to the fan 157 and lamp 161 for a pre-determined period of time, beneficially about five (5) minutes as controlled by embedded software.

Power to charge the battery 160 is obtained during daylight hours via a solar cell 158 that is mounted on the cover exterior cover 154. The solar cell 158 works in conjunction with the battery 160 and the controller 162, which provides for voltage regulation. A battery access door 155 is includes along the rear wall of the housing 153 to enable replacement of the battery 160 when necessary.

It is envisioned that other styles and configurations of the present invention can be easily incorporated into the teachings of the present invention. Only one particular configuration is shown and described for purposes of clarity and disclosure and not by way of limitation of scope.

The preferred embodiment of the present invention can be used by the common user in a simple and effortless manner with little or no training. After initial purchase or acquisition of the litter box and sifting system 10, it would be installed as indicated in FIGS. 1 and 2.

The method of installing the litter box and sifting system 10 may be achieved by performing the following steps: procuring the litter box and sifting system 10; installing an opening in a structural wall 200 in a desired position and having width and height dimensions which correspond to those of the stationary tunnel section 24 of the cat door assembly 20; inserting the stationary tunnel section 24 through the opening until the interior mounting frame 26 makes contact with an interior wall of the structural wall 200; attaching the interior mounting frame 26 to the interior wall using fasteners 108; trimming an outer end of the stationary tunnel section 24 as needed based upon the thickness of the structural wall 200; sliding the exterior mounting frame 25 onto an outer end of the stationary tunnel section 24 until contacting an outer surface of the structural wall 200; securing the exterior mounting frame 25 to the exterior surface of the structural wall 200 using appropriate fasteners 108; inserting the adjustable tunnel section 28 into the exterior mounting frame 25; positioning the mounting bracket assembly 110 upon an exterior surface of the structural wall 200 so as to result in subsequent correct positioning of the enclosure 60 with regards to the cat door assembly 20; attaching the mounting bracket assembly 110 to the exterior surface of the structural wall 200 using anchor bolts 116 or equivalent fastening means; installing the enclosure 60 into the mounting bracket assembly 110 by engaging the respective mounting channel 76 and bracket appendages 112; connecting the enclosure 60 to the cat door assembly 20 by inserting the male sealing feature 34 of the tunnel connector section 30 into the corresponding female sealing feature 32 of the adjustable tunnel section 28 until obtaining a snapping connection; routing the wiring 164 along interior surfaces of the enclosure 60 between the light/fan unit 150 and the switch 152; connecting the wiring 164 to the connector 166 of the switch 152; sliding the tray slide plates 94 completely into the tray slide plate aperture 95 of both tray assemblies 90a, 90b until completely covering respective tray screen 92; inserting the tray assemblies 90a, 90b along the respective first 80 and second 82 channels of the skirt 78 until contacting the stop feature 84 of the rear wall 64 of the enclosure 60; removing the lid 130 of the enclosure 60; adding a desired quantity of litter 210 into the first tray assembly 90a; and, replacing the lid 130 securely upon an upper perimeter edge of the enclosure 60.

The method of utilizing the litter box and sifting system 10 may be achieved by performing the following steps: exposing the solar cell 158 to daylight for a period of time to charge the batteries 160; allowing the litter box and sifting system 10 to be utilized by a pet in a normal manner resulting in pet waste being received into the first tray assembly 90a; activating the light/fan unit 150 automatically as the pet activates the switch 152 while entering the cat door assembly 20; sifting the litter 210 within the first tray assembly 90a when desired by grasping and pulling the integral pull tab 100 to slide the tray slide plate 94 outwardly; allowing the litter 210 within the first tray assembly 90a to flow downward through the tray screen 92 into the lower tray assembly 90b, leaving the pet waste within the first tray assembly 90a; replenishing the litter 210 by switching the positions of the first tray assembly 90a and the second tray assembly 90b, thereby relocating the sifted litter 210 to the upper position for use by the pet; adding a quantity of new litter 210 as necessary; and, removing the first tray assembly tray assembly 90a containing the solid pet waste; disposing of the solid pet waste in a normal manner; reinstalling the first tray assembly 90a into the lower position thus resetting the unit for use. The use of the litter box and sifting system 10 provides pet owners an easy method to maintain a litter box without the usual mess and odors present within a residence as associated with such devices.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:

1. A litter box and sifting system, comprising:
a litter box enclosure having a front wall with an opening, a back wall, and a first tray support;
a mounting system for mounting said litter box enclosure on the exterior of a building;
a cat door assembly having a door for an entrance, a stationary tunnel section having an interior mounting frame for connecting to the interior of a building and extending from the door, an exterior mounting frame surrounding said stationary tunnel section for connecting to the exterior of a building, and an adjustable tunnel section connecting said stationary tunnel section to said opening, wherein said cat door assembly is for enabling a pet to pass from the interior of a building into said litter box enclosure;
a first tray assembly for holding cat litter and mounted on said first tray support; and,
a fan attached to said litter box enclosure for evacuating odors from said litter box.

2. The litter box and sifting system according to claim 1 wherein said door is a flap-type door.

3. The litter box and sifting system according to claim 1, wherein said adjustable tunnel section includes a first sealing feature, wherein said stationary tunnel section includes a second sealing feature, and wherein said first sealing feature and said second sealing feature mate to form a seal.

4. The litter box and sifting system according to claim 1, wherein said cat door assembly is weatherproof.

5. The litter box and sifting system according to claim 1, further including a switch attached to said interior mounting frame such that said switch is actuated when a pet enters said door, and wherein when actuated said switch turns on said fan.

6. The litter box and sifting system according to claim 5, further including a light that illuminates said litter box enclosure when said switch is actuated.

7. The litter box and sifting system according to claim 1, further including a removable lid attached to said litter box enclosure.

8. The litter box and sifting system according to claim 1, wherein said first tray support comprises a bottom skirt having sides that form first "U"-shaped channels that are configured to support said first tray assembly.

9. The litter box and sifting system according to claim 8, wherein first tray assembly includes inverted first "U"-shaped tray lips that mate with said first "U"-shaped channels.

10. The litter box and sifting system according to claim 8, wherein back wall includes a stop feature for limiting travel of said first tray assembly along said first "U"-shaped channels.

11. The litter box and sifting system according to claim 10, wherein said first tray assembly includes a first tray screen for sifting litter, a first tray slide plate for covering said first tray screen to prevent sifting litter and for providing a floor for a pet, and a first tray slide plate aperture for enabling separating said first tray slide plate from said first tray slide plate.

12. The litter box and sifting system according to claim 11, further including a second tray assembly having inverted second "U"-shaped tray lips that mate with second "U"-shaped channels on said sides of said bottom skirt.

13. The litter box and sifting system according to claim 12, wherein said first tray assembly and said second tray assembly are interchangeable.

14. The litter box and sifting system according to claim 12, wherein said skirt is configured to arrange said first tray assembly and said second tray assembly in an over-under configuration.

15. The litter box and sifting system according to claim 12, wherein said litter box enclosure includes an internal tapering curb feature that funnels pet feces toward said first tray assembly.

16. The litter box and sifting system according to claim 7, wherein said removable lid includes a plurality of louvers for ventilating said litter box enclosure.

17. The litter box and sifting system according to claim 1, further including a bracket assembly for mounting said litter box enclosure to the exterior of a building.

18. The litter box and sifting system according to claim 1, further including a rechargeable battery for powering said fan and a solar cell for charging said rechargeable battery.

* * * * *